United States Patent
Baba et al.

(10) Patent No.: US 9,518,817 B2
(45) Date of Patent: Dec. 13, 2016

(54) INNER DIAMETER MEASURING DEVICE

(71) Applicant: IHI Corporation, Koto-ku, Tokyo (JP)

(72) Inventors: Michiko Baba, Tokyo (JP); Kouzou Hasegawa, Tokyo (JP); Norimasa Taga, Tokyo (JP)

(73) Assignee: IHI Corporation, Tokyo (JP)

( * ) Notice: Subject to any disclaimer, the term of this patent is extended or adjusted under 35 U.S.C. 154(b) by 358 days.

(21) Appl. No.: 14/377,234

(22) PCT Filed: Feb. 7, 2013

(86) PCT No.: PCT/JP2013/053592
§ 371 (c)(1),
(2) Date: Aug. 7, 2014

(87) PCT Pub. No.: WO2013/118914
PCT Pub. Date: Aug. 15, 2013

(65) Prior Publication Data
US 2015/0015695 A1 Jan. 15, 2015

(30) Foreign Application Priority Data
Feb. 9, 2012 (JP) .................................. 2012-026046

(51) Int. Cl.
*G01B 11/02* (2006.01)
*G01B 11/12* (2006.01)
(Continued)

(52) U.S. Cl.
CPC .................. *G01B 11/12* (2013.01); *G01B 5/12* (2013.01); *G01B 21/14* (2013.01); *H04N 5/2251* (2013.01); *H04N 2005/2255* (2013.01)

(58) Field of Classification Search
CPC ......... G01B 11/24; G01B 11/12; G01B 11/00; G01N 21/00
(Continued)

(56) References Cited

U.S. PATENT DOCUMENTS 1,664,851 A 4/1928 Class
1,721,524 A 7/1929 Moore
(Continued)

FOREIGN PATENT DOCUMENTS

EP 0076144 A2 4/1983
EP 0373514 A1 6/1990
(Continued)

OTHER PUBLICATIONS

International Search Report and Written Opinion mailed Apr. 23, 2013 in co-pending PCT application No. PCT/JP2013/053589.
(Continued)

*Primary Examiner* — Tarifur Chowdhury
*Assistant Examiner* — Isiaka Akanbi
(74) *Attorney, Agent, or Firm* — Nields, Lemack & Frame, LLC (57) ABSTRACT

An inner diameter measuring device comprises an object to be measured supporting carriage, being arranged movably along a rail installed on an upper surface of a bed and used for holding a hollow pipe to be measured, a supporting shaft extended from a base end to a forward end of the bed, being insertable into the pipe to be measured and being cantilever-supported, and an inner diameter measuring unit installed on a forward end of the supporting shaft, being insertable into the pipe to be measured and for measuring the inner surface of the pipe to be measured. The inner diameter measuring unit is adapted to be inserted into the pipe to be measured, and is adapted to measure an inner diameter of the pipe to be measured in a process where the object to be measured supporting carriage is moved toward the base end of the supporting shaft.

15 Claims, 6 Drawing Sheets

(51) Int. Cl.
  *G01B 21/14* (2006.01)
  *G01B 5/12* (2006.01)
  *H04N 5/225* (2006.01)

(58) Field of Classification Search
  USPC .............................. 356/156, 630, 626, 635
  See application file for complete search history.

(56) References Cited

U.S. PATENT DOCUMENTS

| | | | |
|---|---|---|---|
| 2,822,620 | A | 2/1958 | Ulfeldt |
| 3,028,496 | A * | 4/1962 | Kennard ............... G01N 21/86 250/303 |
| 3,247,732 | A | 4/1966 | Barnhart |
| 3,436,967 | A | 4/1969 | Post |
| 3,771,350 | A | 11/1973 | Romans |
| 4,045,877 | A | 9/1977 | Rutter |
| 4,382,338 | A | 5/1983 | Possati et al. |
| 4,536,963 | A | 8/1985 | Yamamoto et al. |
| 4,631,834 | A | 12/1986 | Hayashi et al. |
| 4,872,269 | A | 10/1989 | Sattmann |
| 4,899,277 | A | 2/1990 | Iizuka et al. |
| 4,934,813 | A | 6/1990 | Yaginuma et al. |
| 4,937,524 | A | 6/1990 | Fasnacht et al. |
| 4,967,092 | A | 10/1990 | Fraignier et al. |
| 5,083,384 | A | 1/1992 | Possati et al. |
| 5,095,634 | A * | 3/1992 | Overlach ............... G01B 5/003 33/543 |
| 5,224,274 | A | 7/1993 | Blaiklock |
| 5,259,119 | A * | 11/1993 | Yoshioka ............... G01B 5/12 33/502 |
| 5,808,250 | A | 9/1998 | Torii et al. |
| 5,933,231 | A | 8/1999 | Bieman et al. |
| 6,243,962 | B1 | 6/2001 | Brock |
| 6,249,007 | B1 | 6/2001 | Gooch et al. |
| 6,427,353 | B1 | 8/2002 | Nelson et al. |
| 6,931,149 | B2 | 8/2005 | Hagene et al. |
| 8,033,032 | B2 | 10/2011 | Fujikawa et al. |
| 8,841,603 | B1 | 9/2014 | Blanton et al. |
| 8,842,297 | B2 | 9/2014 | Størksen et al. |
| 9,145,924 | B2 | 9/2015 | Baba et al. |
| 9,372,061 | B2 | 6/2016 | Baba et al. |
| 9,372,073 | B2 | 6/2016 | Baba et al. |
| 9,410,795 | B2 | 8/2016 | Baba et al. |
| 2003/0198374 | A1 | 10/2003 | Hagene et al. |
| 2004/0114793 | A1 | 6/2004 | Bondurant |
| 2006/0044089 | A1 | 3/2006 | Kang et al. |
| 2006/0112577 | A1 | 6/2006 | Jones |
| 2006/0283037 | A1 | 12/2006 | Galle |
| 2008/0105067 | A1 | 5/2008 | Frey |
| 2009/0144999 | A1 | 6/2009 | Lau |
| 2010/0005676 | A1 | 1/2010 | Fujikawa et al. |
| 2010/0060904 | A1 | 3/2010 | Keightley et al. |
| 2010/0110448 | A1 | 5/2010 | Johnson et al. |
| 2011/0080588 | A1 | 4/2011 | Segall |
| 2015/0000465 | A1 | 1/2015 | Baba et al. |
| 2015/0002836 | A1 | 1/2015 | Baba et al. |
| 2015/0007440 | A1 | 1/2015 | Baba et al. |
| 2015/0009322 | A1 | 1/2015 | Baba et al. |
| 2015/0015873 | A1 | 1/2015 | Baba et al. |
| 2015/0020395 | A1 | 1/2015 | Baba et al. |
| 2015/0131109 | A1 | 5/2015 | Baba et al. |

FOREIGN PATENT DOCUMENTS

| | | |
|---|---|---|
| EP | 1434076 A1 | 6/2004 |
| EP | 2818825 A1 | 12/2014 |
| FR | 2730304 A1 | 8/1996 |
| GB | 1388475 A | 3/1975 |
| JP | 50-159355 A | 12/1975 |
| JP | 57-22501 A | 2/1982 |
| JP | 58-66809 A | 4/1983 |
| JP | 59-187155 A | 10/1984 |
| JP | 61-144551 A | 7/1986 |
| JP | 61-282659 A | 12/1986 |
| JP | 63-55441 A | 3/1988 |
| JP | 63-159708 A | 7/1988 |
| JP | 1-195309 A | 8/1989 |
| JP | 3-502491 A | 6/1991 |
| JP | 5-62573 A | 3/1993 |
| JP | 7-55426 A | 3/1995 |
| JP | 7-29405 U | 6/1995 |
| JP | 7-191269 A | 7/1995 |
| JP | 8-14874 A | 1/1996 |
| JP | 8-93876 A | 4/1996 |
| JP | 9-311034 A | 12/1997 |
| JP | 10-137962 A | 5/1998 |
| JP | 10-197215 A | 7/1998 |
| JP | 10-213404 A | 8/1998 |
| JP | 2000-136923 A | 5/2000 |
| JP | 2000-146564 A | 5/2000 |
| JP | 2002-22671 A | 1/2002 |
| JP | 2002-148036 A | 5/2002 |
| JP | 2003-139525 A | 5/2003 |
| JP | 2003-329606 A | 11/2003 |
| JP | 2004-176852 A | 6/2004 |
| JP | 3105724 U | 11/2004 |
| JP | 2005-315814 A | 11/2005 |
| JP | 2005-331333 A | 12/2005 |
| JP | 2006-153546 A | 6/2006 |
| JP | 2006-156138 A | 6/2006 |
| JP | 2006-229551 A | 8/2006 |
| JP | 2006-234525 A | 9/2006 |
| JP | 2007-57305 A | 3/2007 |
| JP | 2007-71852 A | 3/2007 |
| JP | 2007-248465 A | 9/2007 |
| JP | 2007-292699 A | 11/2007 |
| JP | 4230408 B2 | 2/2009 |
| JP | 2010-164334 A | 7/2010 |
| JP | 2011-2439 A | 1/2011 |
| JP | 2011-13060 A | 1/2011 |
| WO | 97/02480 A1 | 1/1997 |
| WO | 2007051332 A2 | 5/2007 |
| WO | 2009152851 A1 | 12/2009 |
| WO | 2013/118918 A1 | 8/2013 |

OTHER PUBLICATIONS

International Preliminary Report on Patentability mailed Aug. 21, 2014 in co-pending PCT application No. PCT/JP2013/053589.
International Search Report and Written Opinion mailed Apr. 2, 2013 in co-pending PCT application No. PCT/JP2013/053590.
International Preliminary Report on Patentability mailed Aug. 21, 2014 in co-pending PCT application No. PCT/JP2013/053590.
International Search Report and Written Opinion mailed Apr. 23, 2013 in co-pending PCT application No. PCT/JP2013/053591.
International Preliminary Report on Patentability mailed Aug. 21, 2014 in co-pending PCT application No. PCT/JP2013/053591.
International Search Report and Written Opinion mailed May 7, 2013 in corresponding PCT application No. PCT/JP2013/053592.
International Preliminary Report on Patentability mailed Aug. 21, 2014 in corresponding PCT application No. PCT/JP2013/053592.
International Search Report and Written Opinion mailed Mar. 12, 2013 in co-pending PCT application No. PCT/JP2013/053599.
International Preliminary Report on Patentability mailed Aug. 21, 2014 in co-pending PCT application No. PCT/JP2013/053599.
International Search Report and Written Opinion mailed May 7, 2013 in co-pending PCT application No. PCT/JP2013/053597.
International Preliminary Report on Patentability mailed Aug. 21, 2014 in co-pending PCT application No. PCT/JP2013/053597.
International Search Report and Written Opinion mailed Apr. 16, 2013 in co-pending PCT application No. PCT/JP2013/053598.
International Preliminary Report on Patentability mailed Aug. 21, 2014 in co-pending PCT application No. PCT/JP2013/053598.
International Search Report and Written Opinion mailed Apr. 2, 2013 in co-pending PCT application No. PCT/JP2013/053603.
International Preliminary Report on Patentability mailed Aug. 21, 2014 in co-pending PCT application No. PCT/JP2013/053603.
Final rejection mailed Dec. 29, 2015 in co-pending U.S. Appl. No. 14/377,238.

(56) References Cited

OTHER PUBLICATIONS

Office action mailed Dec. 30, 2015 in co-pending U.S. Appl. No. 14/377,226.
Office action mailed Mar. 22, 2016 in co-pending U.S. Appl. No. 14/377,238.
Notice of Allowance mailed Feb. 16, 2016 in co-pending U.S. Appl. No. 14/377,237.
Notice of Allowance mailed Mar. 1, 2016 in co-pending U.S. Appl. No. 14/377,237.
Notice of Allowance mailed Mar. 30, 2016 in co-pending U.S. Appl. No. 14/377,227.
Notice of Allowance mailed Jun. 2, 2016 in co-pending U.S. Appl. No. 14/377,238.
Office action mailed Apr. 18, 2016 in co-pending U.S. Appl. No. 14/377,230.
Notice of Allowance mailed May 13, 2016 in co-pending U.S. Appl. No. 14/377,226.
Office action mailed Jul. 28, 2016 in co-pending U.S. Appl. No. 14/377,236.
Notice of Allowance mailed Aug. 2, 2016 in co-pending U.S. Appl. No. 14/377,230.
European communication dated Sep. 9, 2015 in co-pending European patent application No. 13746779.1.
Office action mailed Sep. 1, 2015 in co-pending U.S. Appl. No. 14/377,238.
European communication dated Sep. 4, 2015 in co-pending European patent application No. 13747139.7.
European communication dated Sep. 18, 2015 in corresponding European patent application No. 13746866.6.
European communication dated Sep. 14, 2015 in co-pending European application No. 13746596.9.
European communication dated Oct. 7, 2015 in co-pending European patent application No. 13747245.2.
European communication dated Sep. 9, 2015 in co-pending European patent application No. 13746053.1.
European communication dated Nov. 11, 2015 in co-pending European patent application No. 13746339.4.
European communication dated Oct. 8, 2015 in co-pending European patent application No. 13746993.8.
Office action mailed Dec. 1, 2015 in co-pending U.S. Appl. No. 14/377,227.
Office Action mailed Mar. 25, 2015 in co-pending U.S. Appl. No. 14/377,225.
Notice of Allowance mailed Jul. 13, 2015 in co-pending U.S. Appl. No. 14/377,225.

* cited by examiner

INNER DIAMETER MEASURING DEVICE

TECHNICAL FIELD

The present invention relates to an inner diameter measuring device for measuring an inner diameter of a hollow member, in particular, for measuring an inner diameter of a hollow pipe.

BACKGROUND ART

As a device for measuring inner diameter of a hollow member or a hollow shaft, a device disclosed in the Patent Document 1, for example, is already known.

In the inner diameter measuring device as disclosed in the Patent Document 1, a pipe to be inspected is rotatably supported by a pipe rotation supporting device, and a running carriage device has a pair of inner diameter measuring sensors at upper and lower positions, being provided in such a manner that the pair of inner diameter measuring sensors can be brought closer to or separated from each other. By the moving of the running carriage device, the inner diameter measuring sensors are inserted in a pipe to be inspected, and the inner diameter measuring sensors are separated in upper and lower directions and are brought into contact with the inner surface of the pipe to be inspected. Further, the pipe to be inspected is rotated by a pipe rotation supporting device, and the inner diameter of the pipe to be inspected is measured.

The inner diameter measuring device as described above is designed in such structure that a pipe rotation supporting device for rotating the pipe to be inspected has a driving unit and the running carriage device is moved and a pair of inner diameter measuring sensors move up and down, and therefore has a complex structure. Further, inner diameter measurement is limited to a range where the inner diameter measuring sensors can be inserted. As a result, there is a problem in that the inner diameter of the pipe to be inspected cannot be measured if the pipe to be inspected has a longer axis.

To solve the problems as described above, it is an object of the present invention to provide an inner diameter measuring device, which is designed in simple structure and by which it is possible to perform a measurement of the inner diameter of a hollow pipe.

CONVENTIONAL ART REFERENCE

Patent Document 1: JP-A-2000-136923

DISCLOSURE OF THE INVENTION

The present invention relates to an inner diameter measuring device, comprising an object to be measured supporting carriage, being arranged movably along a rail installed on an upper surface of a bed and used for holding a hollow pipe to be measured, a supporting shaft extended from a base end to a forward end of the bed, being insertable into the pipe to be measured and being cantilever-supported, and an inner diameter measuring unit installed on a forward end of the supporting shaft, being insertable into the pipe to be measured and for measuring the inner surface of the pipe to be measured under inserted condition, wherein the pipe to be measured and the inner diameter measuring unit are installed along a same reference line, the object to be measured supporting carriage is movable from a condition where the inner diameter measuring unit is withdrawn from the pipe to be measured to a condition where the inner measuring unit reaches a base part of the pipe to be measured, the inner diameter measuring unit is adapted to be inserted into the pipe to be measured, and is adapted to measure an inner diameter of the pipe to be measured in a process where the object to be measured supporting carriage is moved toward the base end of the supporting shaft.

Further, the present invention relates to the inner diameter measuring device, wherein a first reference jig unit is installed on a forward end of the object to be measured supporting carriage, a second reference jig unit is installed on a base end of the object to be measured supporting carriage, wherein the first reference jig unit and the second reference jig unit are installed concentrically with the reference line and have reference rings respectively, each of reference rings has an inner diameter and an outer diameter, and at least inner diameter is already known, wherein the inner diameter of the reference ring is measured by the inner diameter measuring unit, and the measurement result of the pipe to be measured is corrected based on the measurement result of the reference ring.

Further, the present invention relates to the inner diameter measuring device, wherein the object to be measured supporting carriage has a forward end slider, a base end slider, a connecting member with adjustable length for connecting the forward end slider and the base end slider, and pipe holding units installed on the forward end slider and the base end slider respectively, wherein the pipe to be measured is placed on the pipe holding units where a distance is set according to a length of the pipe to be measured.

Further, the present invention relates to the inner diameter measuring device, wherein the pipe holding unit comprises a pair of rollers where the pipe to be measured is placed, and a mechanism for adjusting position of the pipe to be measured in horizontal and vertical directions via the roller.

Further, the present invention relates to the inner diameter measuring device, wherein a laser emitter is installed at one end of the bed, and the reference line is formed by a laser beam emitted by the laser emitter.

Further, the present invention relates to the inner diameter measuring device, further comprising a centering laser device provided so as to stride over the bed at a required position of the bed, wherein the centering laser device has a horizontal laser distance measuring unit for measuring a distance in horizontal direction and a vertical laser distance measuring unit for measuring a distance in vertical direction, the horizontal laser distance measuring unit and the vertical laser distance measuring unit are set up so that a distance measuring light optical axis of the horizontal laser distance measuring unit and a distance measuring light optical axis of the vertical laser distance measuring unit cross on the reference line, and the pipe to be measured has at least two outer diameter reference surfaces separated from each other in axial direction, the pipe to be measured is moved by the object to be measured supporting carriage, the outer diameter reference surface is measured by the horizontal laser distance measuring unit and the vertical laser distance measuring unit, and a centering of the pipe to be measured is performed based on the measurement result.

Further, the present invention relates to the inner diameter measuring device, wherein the supporting shaft is cantilever-supported by a supporting mechanism unit, the supporting mechanism unit tiltably supports the supporting shaft, and a supporting end of the supporting shaft is tilted so that a center line of the inner diameter measuring unit coincides with the reference line.

Further, the present invention relates to the inner diameter measuring device, wherein the inner diameter measuring unit is a contact type inner diameter measuring instrument, and comprises a rotating base being rotatable around a center line of the inner diameter measuring unit as the center, a measuring instrument holder provided movably in radial direction on the rotating base and an electric micrometer being held on the measuring instrument holder.

Further, the present invention relates to the inner diameter measuring device, wherein the inner diameter measuring unit is a non-contact type inner diameter measuring instrument and comprises a CCD camera, a laser projector and a cone mirror, wherein the CCD camera, the laser projector and the cone mirror are provided on a center line of the inner diameter measuring unit, wherein a laser beam projected from the laser projector is reflected over total circumference by the cone mirror and the CCD camera takes image of an optical ring formed when the laser beam is projected on inner surface of the pipe to be measured.

Furthermore, the present invention relates to the inner diameter measuring device, wherein the contact type inner diameter measuring unit is prepared integrally with a non-contact type inner diameter measuring unit.

BEST MODE FOR CARRYING OUT THE INVENTION

Description will be given below on an embodiment of the present invention by referring to the attached drawings.

First, by referring to FIG. 1, description will be given on general features of an embodiment according to the present invention.

Figure 1:
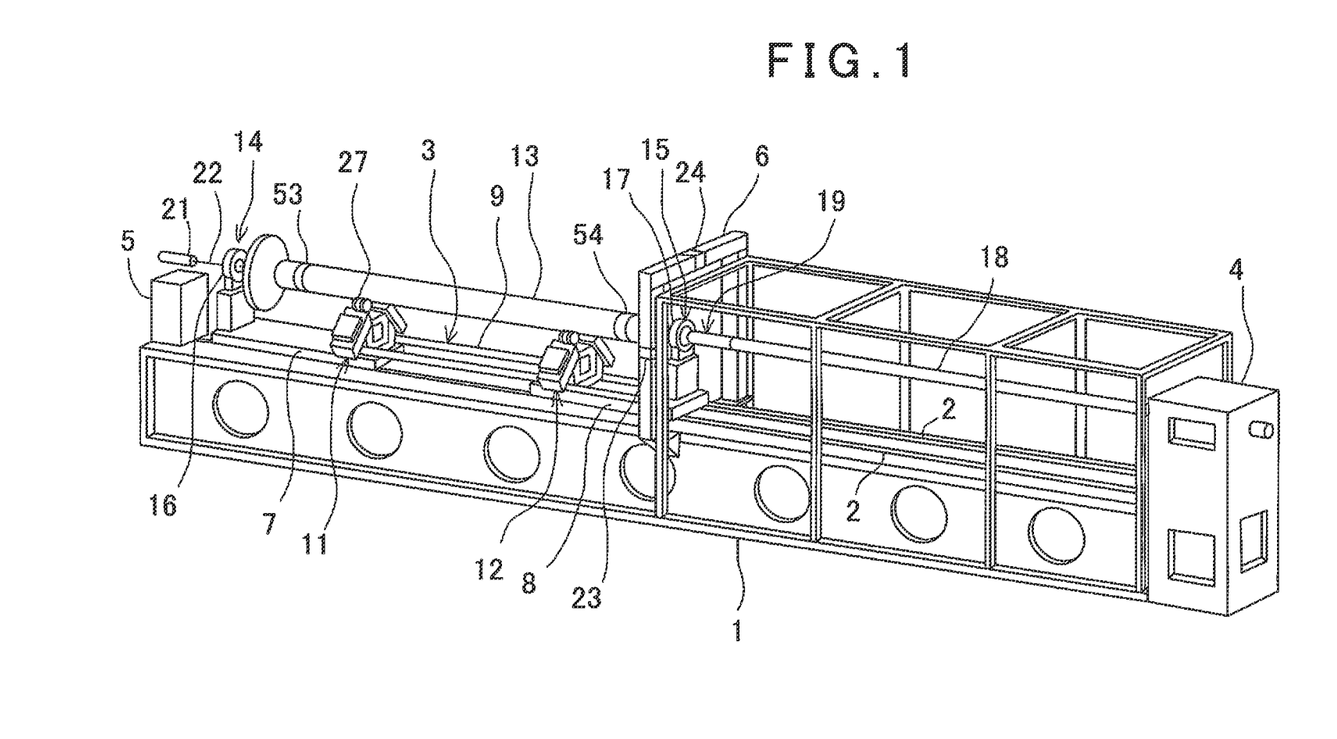
FIG. 1 is an overall perspective view of an inner diameter measuring device according to an embodiment of the present invention.

In FIG. 1, reference numeral 1 denotes a bed, a rail 2 is laid on an upper surface of the bed 1, an object to be measured supporting carriage 3 is laid on the rail 2, and the object to be measured supporting carriage 3 is arranged as movable along the rail 2. Further, the position in a moving direction of the object to be measured supporting carriage 3 is arranged so as to be measured by a linear scale provided along the rail 2 or by a measuring device or a scale that is additionally prepared.

A measuring device main unit 4 is disposed on a base end (shown at the right end in FIG. 1) of the bed 1, and a reference guide laser device 5 is mounted on an upper surface of the bed 1. Further, approximately at the center of the bed 1, a centering laser device 6 of portal type is disposed so as to stride over the bed 1. It is to be noted that, the position to dispose the centering laser device 6 is preferable at approximately the center of the bed 1, but the position to be disposed is arbitrary if outer diameter reference surfaces 53 and 54 of a pipe to be measured 13, i.e. a hollow and long object to be measured, as to be described later, can be measured at the position. In this case, the pipe to be measured 13 is a long object with an axial length of about 3000 mm and with a diameter of about 70 to 150 mm ($\phi$).

The object to be measured supporting carriage 3 has a forward end slider 7 and a base end slider 8 being slidably mounted on the rail 2, and the forward end slider 7 and the base end slider 8 are connected by a connecting rod 9 with its length adjustable.

Pipe holding units 11 and 12 are arranged on the forward end slider 7 and the base end slider 8 respectively, and the pipe to be measured 13 is disposed to stride over the pipe holding units 11 and 12. The pipe holding units 11 and 12 have the same structure, and it is possible to adjust the supporting positions of the pipe to be measured 13 in horizontal direction and in up-and-down direction.

At the forward end of the forward end slider 7, a first reference jig unit 14 is erected, and a second reference jig unit 15 is erected on a base end of the base end slider 8. A reference ring 16 and a reference ring 17 are provided on the first reference jig unit 14 and the second reference jig unit 15 respectively, both the outer diameter and the inner diameter of the reference rings 16 and 17 are prepared with high precision, are measured in advance, and outer diameter and inner diameter are values already known.

From the measuring device main unit 4, a supporting shaft 18 is extended in horizontal direction toward the forward end, and an inner diameter measuring unit 19 is mounted at a forward end of the supporting shaft 18. The supporting shaft 18 is a long member, having an axial length of about 3000 mm and a diameter of about 60 mm ($\phi$) to correspond to the pipe to be measured 13. The supporting shaft 18 is designed to be hollow, and cables and the like (not shown) connected to the inner diameter measuring unit 19 are connected to the measuring device main unit 4 through an inner portion of the supporting shaft 18. Inside the measuring device main unit 4, a signal processing device such as a PC is provided, and an absolute value (actual dimension) is calculated based on a signal acquired at the inner diameter measuring unit 19.

The inner diameter measuring unit 19 includes a contact type measuring head and a non-contact type measuring head, the contact type measuring head and the non-contact type measuring head are disposed as attachable and detachable at the forward end of the supporting shaft 18 respectively, either one of the contact type measuring head or the non-contact type measuring head is mounted as appropriate according to the measuring conditions, or it is arranged so that both the contact type measuring head and the non-contact type measuring head can be mounted.

The reference guide laser device 5 comprises a laser emitter 21, the laser emitter 21 is installed in such a manner that an optical axis runs in horizontal direction, and a laser beam 22 is emitted in horizontal direction from the laser emitter 21. The laser beam 22 serves as a reference line of the inner diameter measuring device, and the pipe to be measured 13, the reference rings 16 and 17 and the supporting shaft 18 are arranged on the optical axis of the laser beam 22 and concentrically.

The centering laser device 6 comprises a horizontal laser distance measuring unit 23 for measuring a distance in horizontal direction and a vertical laser distance measuring unit 24 for measuring a distance in vertical direction, and it is so arranged that the distance measuring optical axis of the horizontal laser distance measuring unit 23 and the distance measuring optical axis of the vertical laser distance measuring unit 24 cross each other on the laser beam 22.

Figure 2:
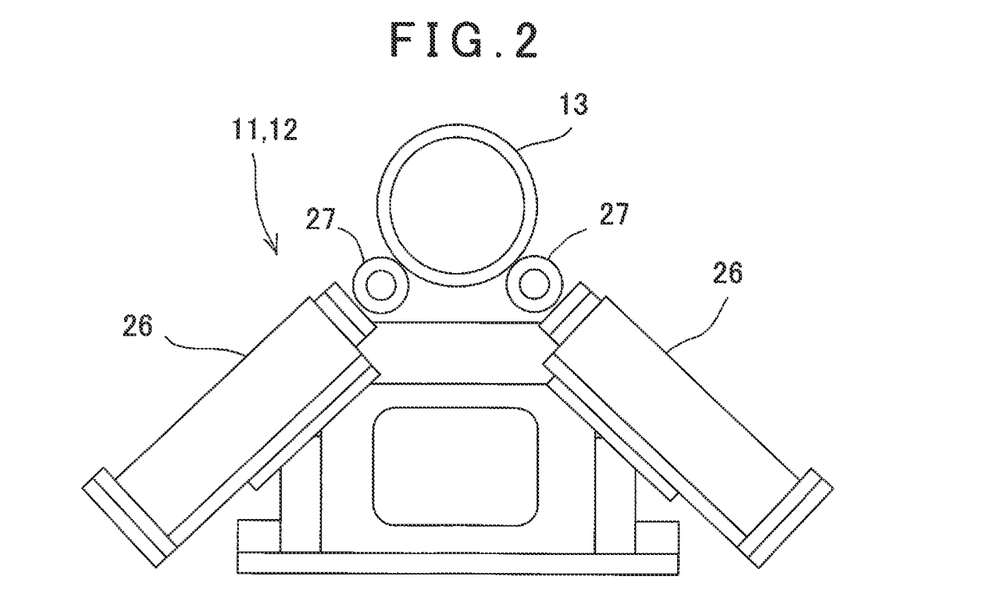
FIG. 2 is an enlarged front view of a pipe holding unit of the inner diameter measuring device.

As seen in FIG. 2, the pipe holding unit 11 has a pair of sliders 26 and 26, which are positioned opposite to each other and are arranged symmetrically with respect to the vertical line so that the sliders 26 slide at a predetermined angle, being tilted at 45°, for instance. On an upper end of each of the sliders 26, a freely rotatable roller 27 is provided, and it is so arranged that the pipe to be measured 13 is placed on two rollers 27 and 27.

It is so arranged that the sliders 26 and 26 are moved up and down separately by motors not shown in the figure, and by moving the sliders 26 and 26 up and down separately, a supporting position of the pipe to be measured 13 can be position-adjusted in horizontal direction and vertical direction.

Figure 3:
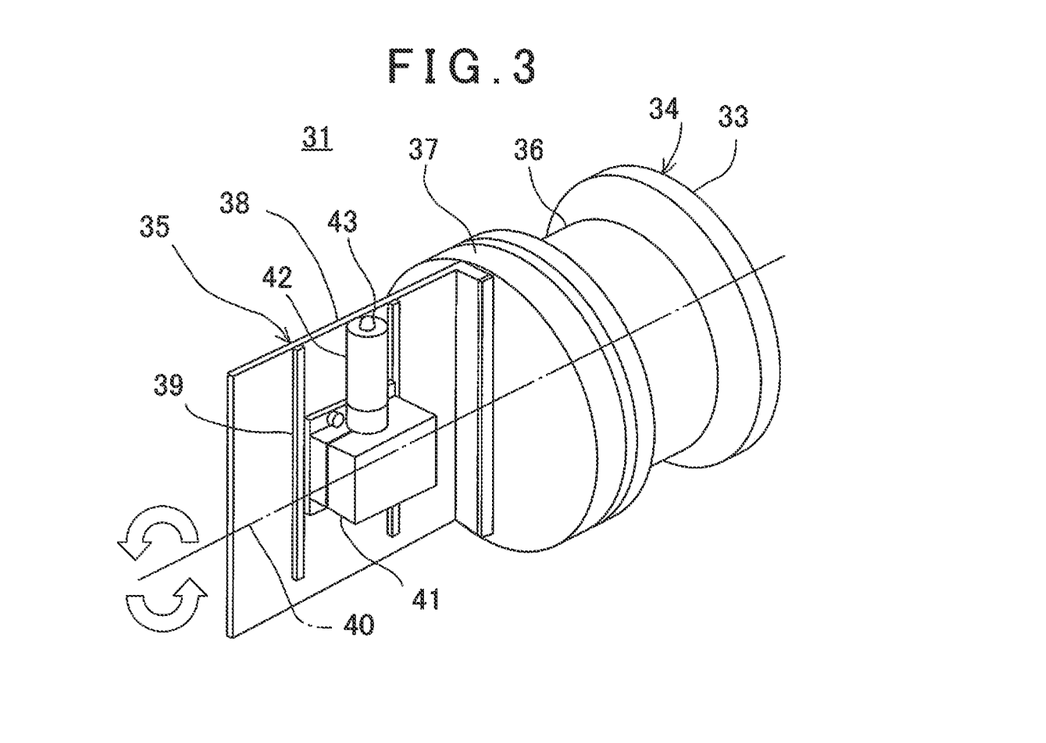
FIG. 3 is a perspective view of a contact type measuring head of the inner diameter measuring device.
Figure 4:
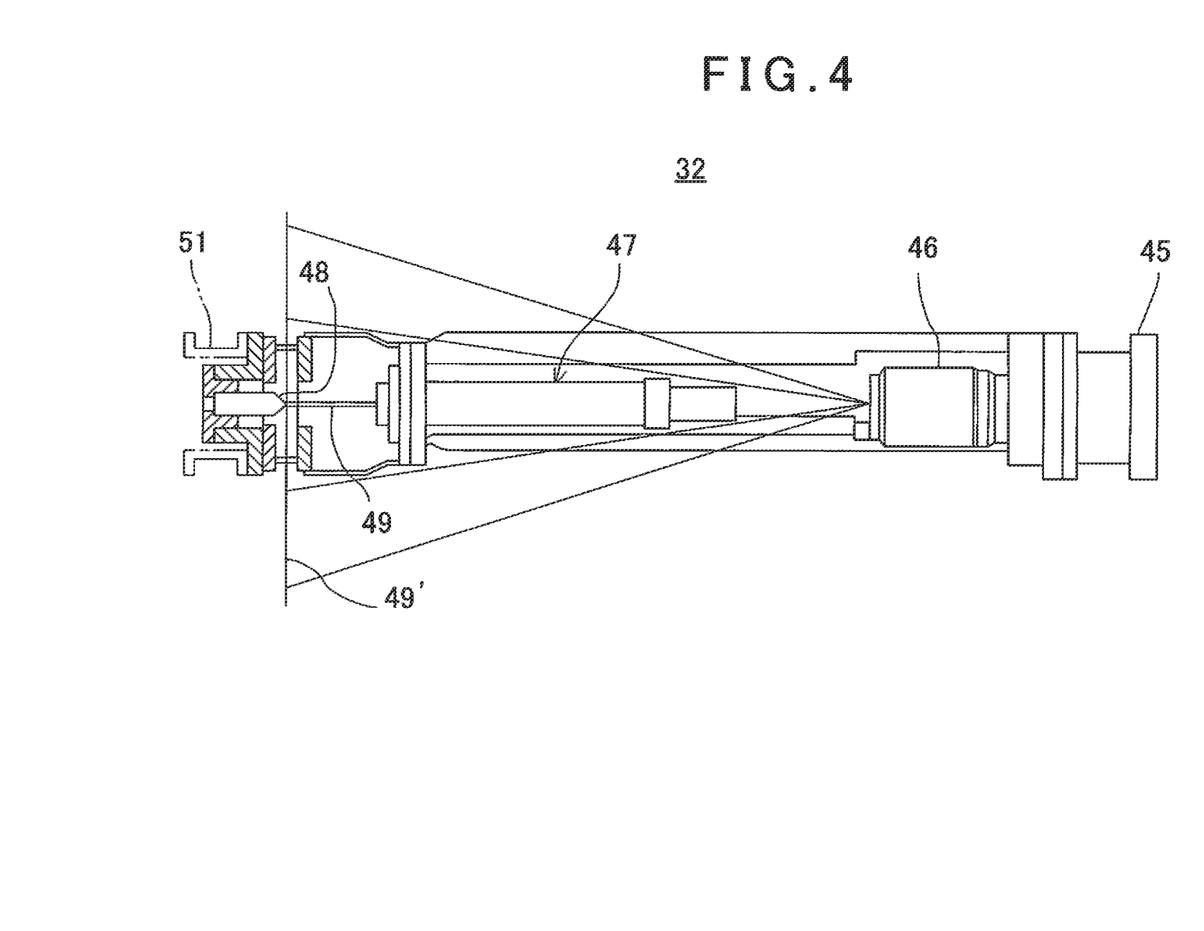
FIG. 4 is a partially cutout side view of a non-contact type measuring head of the inner diameter measuring device.

As the inner diameter measuring unit 19, a contact type measuring head 31 as an inner diameter measuring unit as shown in FIG. 3, or a non-contact type measuring head 32 as an inner diameter measuring unit as shown in FIG. 4, or a combination of the contact type measuring head 31 and the non-contact type measuring head 32 as the inner diameter measuring unit is used.

First, by referring to FIG. 3, description will be given below on the contact type measuring head 31.

The contact type measuring head 31 comprises a connection flange 33 on base end side, and is arranged so as to be fixed at a forward end of the supporting shaft 18 via the connection flange 33. Further, for the connection of the connection flange 33 and the supporting shaft 18, a removable fixing tool such as a bolt is used and the contact type measuring head 31 is designed to be attachable on or detachable from the supporting shaft 18.

Further, the contact type measuring head 31 has a rotating unit 34 and an advancing/retreating unit 35.

The rotation unit 34 has a tube-like case 36 including the connection flange 33, a rotary mechanism not shown in the figure is accommodated in the case 36, a rotating base 37 is provided at a forward end of the rotary mechanism, and the rotating base 37 is adapted to rotate an angle of 360° by the rotating mechanism. Further, it is so arranged that a rotation angle of the rotating base 37 is detected by an angle detector such as an encoder or the like not shown in the figure.

The advancing/retreating unit 35 is mounted on the rotating base 37. The advancing/retreating unit 35 has an advancing/retreating base plate 38 installed perpendicularly to the rotating base 37, and on the advancing/retreating base plate 38, an advancing/retreating rail 39 extended in radial direction (a direction perpendicularly crossing with respect to a rotating center line 40 of the rotating base 37), and a measuring instrument holder 41 is slidably mounted on the advancing/retreating rail 39. On the measuring instrument holder 41, a contact type measuring unit such as an electric micrometer 42 is mounted, the measuring instrument holder 41 is moved forwards or backwards by a motor, e.g. a linear motor, and the amount of moving is detected by a measuring instrument such as linear scale not shown in the figure.

Further, a contact 43 of the electric micrometer 42 is set so as to move along a radius with the rotating center line 40 as the center by the moving of the measuring instrument holder 41.

The contact type measuring head 31 has its maximum diameter smaller than an inner diameter of the pipe to be measured 13, and preferably is configured so as to be accommodated within a cylindrical space which has an outer diameter of the supporting shaft 18 as its maximum diameter.

The measuring instrument holder 41 is moved, the contact 43 is brought into contact with inner surface of the pipe to be measured 13 and the inner diameter of the pipe to be measured 13 is measured based on a displacement detected by the contact 43 and the moving amount of the measuring instrument holder 41. Further, the position in peripheral direction of a point measured by the contact 43 can be specified by detecting a rotation angle of the rotating base 37.

FIG. 4 shows a non-contact type measuring head 32. Description will be given on general features of the non-contact type measuring head 32.

The non-contact type measuring head 32 has a connection flange 45 at the base end, the connection flange 45 has the same shape as the connection flange 33, and the non-contact type measuring head 32 is adapted to be mounted at a forward end of the supporting shaft 18 via the connection flange 45.

The non-contact type measuring head 32 has a non-contact type measuring head center line (optical axis) to coincide with the center line of the supporting shaft 18, and a CCD camera 46, a laser projector 47, and a cone mirror 48 are arranged on the axis of the non-contact measuring head.

When a laser beam 49 is projected from the laser projector 47, the laser beam 49 enters a vertex of the cone mirror 48, and the laser beam 49 is diffused over total circumference by the cone mirror 48 and is reflected. A diffused reflection light 49' is projected to the pipe to be measured 13 and forms an optical ring. The optical ring is photographed by the CCD camera 46, and the inner diameter and the shape of the inner surface of the pipe to be measured 13 are determined.

Similarly to the contact type measuring head 31, the non-contact type measuring head 32 also has its maximum diameter smaller than the inner diameter of the pipe to be measured 13, and preferably is configured so as to be accommodated within a cylindrical space which has the outer diameter of the supporting shaft 18 as its maximum diameter.

Further, the contact type measuring head 31 and the non-contact type measuring head 32 can be mounted at the same time. In this case, a connection adapter 51 is mounted at a forward end of the non-contact type measuring head 32, and the contact type measuring head 31 is mounted at a forward end of the non-contact type measuring head 32 via the connection adapter 51.

In general, measurement accuracy of the contact type measuring head 31 is higher than the non-contact type measuring head 32. Accordingly, by mounting the contact type measuring head 31 and the non-contact type measuring head 32 at the same time, it may be so arranged that while measuring the inner diameter by the non-contact type measuring head 32, precise inner diameter may be measured by the contact type measuring head 31, as for a portion for which higher accuracy is required.

The inner diameter measuring unit 19 is cantilever-supported by the supporting shaft 18. Further, in order to measure an elongated pipe to be measured 13 over total length, the supporting shaft 18 is also designed to be elongated. For this reason, it is inevitable that the supporting shaft is bent.

Further, the present inner diameter measuring device is designed in such a manner that the inner diameter measuring unit 19 is fixed and the pipe to be measured 13 can be moved, and it would suffice if the position and the posture of the inner diameter measuring unit 19 are designed with accuracy to be needed for the measurement. For this reason, the supporting mechanism unit of the supporting shaft 18 is so designed that the center line of the inner diameter measuring unit 19 coincides with the laser beam 22, and that deflection and deflection angle of the supporting shaft 18 are corrected by the supporting mechanism unit.

Figure 5A:
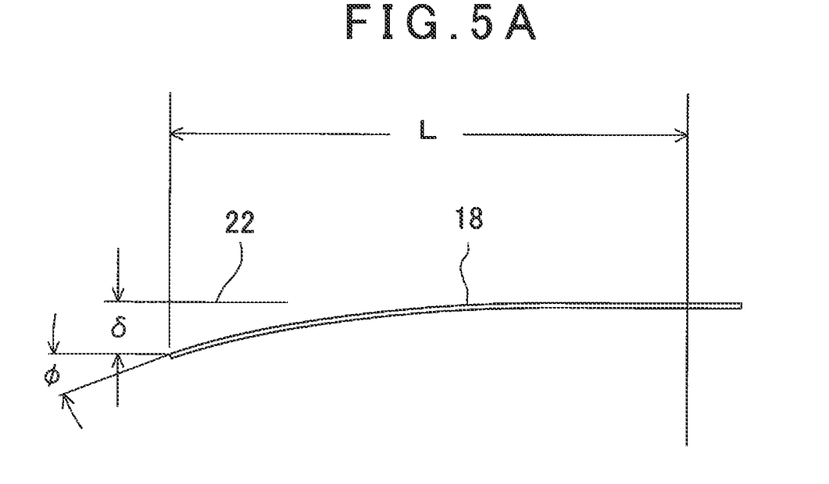
FIG. 5A is an explanatory drawing to show a condition of deflection of a cantilever-supported supporting shaft.
Figure 5B:
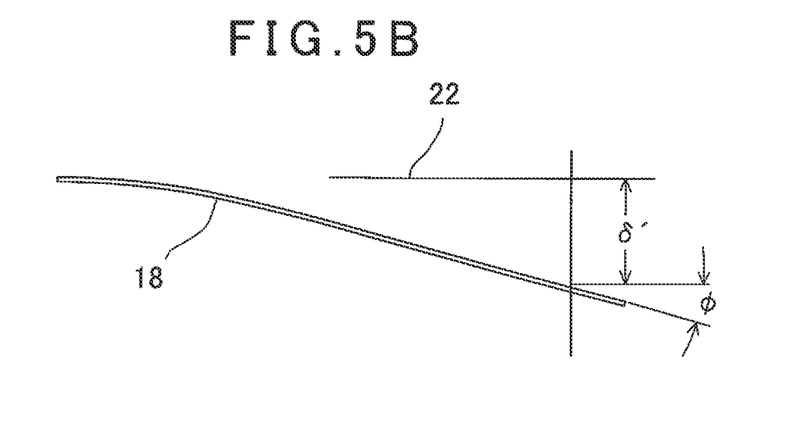
FIG. 5B is an explanatory drawing to show a condition of a supporting mechanism unit when deflection and deflection angle of a forward end of the cantilever-supported supporting shaft are corrected.
Figure 5C:
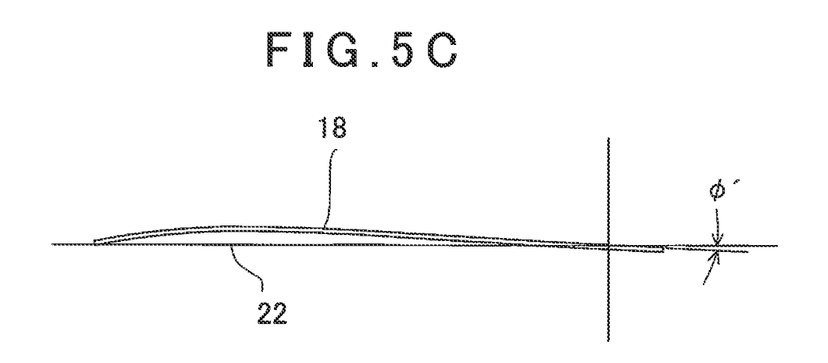
FIG. 5C is an explanatory drawing to show a condition of the supporting mechanism unit in a case where the deflection of a forward end of a cantilever-supported supporting shaft is corrected.
Figure 6A:
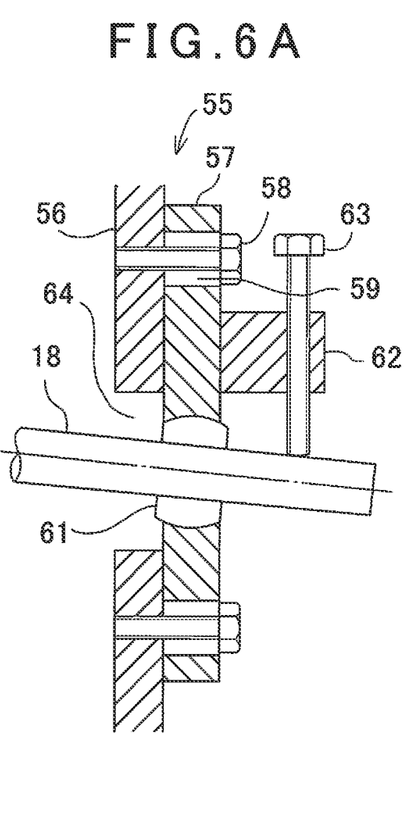
FIG. 6A is a cross-sectional view to show one example of a supporting mechanism unit which correct the deflection and the deflection angle of a forward end of a support shaft.
Figure 6B:
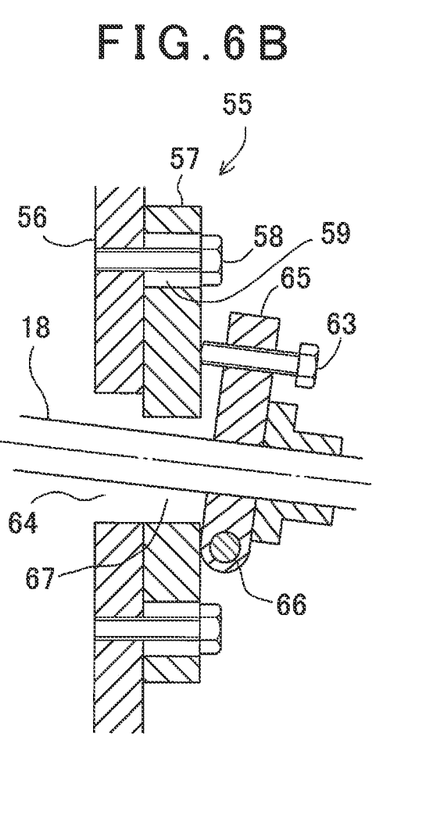
FIG. 6B is a cross-sectional view to show another example of a supporting mechanism unit which correct the deflection and the deflection angle of a forward end of a supporting shaft.

Referring to FIG. 5 and FIG. 6, description will be given on the supporting mechanism unit of the supporting shaft 18.

FIG. 5A shows a condition where the supporting shaft 18 is cantilever-supported. A forward end of the supporting shaft 18 is bent at a deflection δ and tilted at an angle of a deflection angle φ. That is to say, the supporting shaft is displaced downward by δ with respect to the reference line (the laser beam 22) in downward direction, and also tilted at φ counterclockwise with respect to the laser beam 22. Therefore, in order that the forward end is horizontal (tilt angle=0) as shown in FIG. 5B and the displacement with respect to the laser beam 22 will be zero, it can be so arranged that the supporting shaft is tilted clockwise by φ on the supporting mechanism unit side, and that the supporting shaft is displaced downward by δ' with respect to the laser beam 22.

It is to be noted that in FIG. 5A and FIG. 5B, it is drawn rather in an exaggerated manner so that the condition of the deflection can be easily understood. In a case where the supporting shaft 18 has rigidity as a strength member as in the case of the present embodiment, the value of the deflection angle is slight. Therefore, as shown in FIG. 5C, the deflection of the forward end may be corrected by the rotation of the supporting unit only and without giving displacement in downward direction. In this case, the deflection angle cannot be corrected perfectly, but there is practically no problem because the deflection angle itself is very small. Further, in a case where the deflection of the forward end is to be corrected by the rotation of the supporting unit only, the rotation angle φ' of the supporting unit may be as slight as: $\phi' = \tan^{-1} \delta/L$ (L: axial length of the supporting shaft 18). Further, since the deflection angle can be determined simply by calculation, the inner diameter measuring unit 19 may be mounted by tilting in reverse direction by an amount of the deflection angle in advance.

FIG. 6A shows an example of a supporting mechanism unit 55 of the supporting shaft 18.

On a supporting mechanism base 56 installed vertically, a shaft supporting plate 57 is fixed by a bolt 58. A hole where the bolt 58 is passed through the shaft supporting plate 57, is designed as a long hole 59, which is long in up-and-down direction, and the mounting position of the shaft supporting plate 57 can be adjusted in up-and-down direction.

On the shaft supporting plate 57, the supporting shaft 18 is supported via a spherical bearing 61. On the shaft supporting plate 57, a screw block 62 is fixed above the spherical bearing 61, and a tilt adjusting screw 63 is screwed through the screw block 62 in up-and-down direction, and the forward end of the tilt adjusting screw 63 is arranged so as to come in contact with the supporting shaft 18.

By moving the shaft supporting plate 57 in downward direction with respect to the supporting mechanism base 56, the value of δ' can be obtained. When the lower base end of the supporting shaft 18 is pushed down downwards by means of the tilt adjusting screw 63, the supporting shaft 18 is rotated with the spherical bearing 61 as the center, and a tilting to set off the tilting angle φ can be obtained. It is to be noted that, on the supporting mechanism base 56, an escape hole 64 is provided so that interference with the supporting shaft 18 may not occur when the position and the tilting of the base end of the supporting shaft 18 are adjusted.

Further, FIG. 6B shows another example of the supporting mechanism unit 55 of the supporting shaft 18.

On a supporting mechanism base 56 installed vertically, a shaft supporting plate 57 is fixed by the bolt 58. A hole where the bolt 58 passes through the shaft supporting plate 57 is designed as a long hole 56, which is long in up-and-down direction, and the mounting position of the shaft supporting plate 57 can be adjusted in up-and-down direction.

A lower end of a tilting plate 65 is attached rotatably at the shaft supporting plate 57 via a horizontal shaft 66, and the tilting plate 65 is designed to be rotatable freely around the horizontal shaft 66 as the center. A base end of the supporting shaft 18 is supported in fixed manner on the tilting plate 65.

On an upper end of the tilting plate 65, a tilt adjusting screw 63 is screwed through, and a forward end of the tilt adjusting screw 63 come in contact with the shaft supporting plate 57. When the tilt adjusting screw 63 is turned and a forward end is protruded from the tilting plate 65, the tilting plate 65 is tilted around the horizontal shaft 66 as the center. The forward end of the tilting plate 65 is arranged so as to be fixed on the shaft supporting plate 57 via a bolt not shown in the figure. It is to be noted that, an escape hole 67 is provided on the shaft supporting plate 57 so that interference with the supporting shaft 18 may not occur when the tilting of the supporting shaft 18 is adjusted.

Also in the supporting mechanism unit 55, a forward end of the supporting shaft 18 can be set in horizontal direction and at the position of the laser beam 22 by adjusting the position in up-and-down direction of the shaft supporting plate 57 and by adjusting the tilting of the tilting plate 65.

Description will be given below on operation of the inner diameter measuring device according to the present embodiment. First, as preparation prior to the measurement, a length of the connecting rod 9 is adjusted so that spacing between the pipe holding unit 11 and the pipe holding unit 12 is set to a condition, which is suitable for the supporting of the pipe to be measured 13. It is assumed that the contact type measuring head 31 is mounted as the inner diameter measuring unit 19.

The object to be measured supporting carriage 3 is moved, a reference ring 17 on the base end side is set at a measuring position on the centering laser device 6, the outer peripheral surface of the reference ring 17 is measured from two directions, i.e. in horizontal and vertical directions, and measured whether the center line of the reference ring 17 coincides with the laser beam 22. Further, the object to be measured supporting carriage 3 is moved, and a measurement is carried out similarly on the reference ring 16 on the forward end by the centering laser device 6. If both the center line of the reference ring 17 and the center line of the reference ring 16 coincide with the laser beam 22, it means that the object to be measured supporting carriage 3 is moving parallel to the laser beam 22. It is confirmed that the object to be measured supporting carriage 3 is moving parallel to the laser beam 22, and if not parallel, the position and the like of the rail 2 is adjusted.

The pipe to be measured 13 is placed on the pipe holding unit 11 and the pipe holding unit 12, and the centering of the pipe to be measured 13 is performed, that is to say, the position of the pipe to be measured 13 is adjusted so that the center line of the pipe to be measured 13 coincides with the laser beam 22.

On the pipe to be measured 13, outer diameter reference surfaces 53 and 54 prepared with high accuracy are provided at least at two parts of the forward end and the base end, and the positions of the outer diameter reference surfaces 53 and 54 are measured by the centering laser device 6 and the centering of the pipe to be measured 13 is carried out.

First, the outer diameter reference surface 54 is moved to a measuring position of the centering laser device 6, and a position of the outer diameter reference surface 54 is measured by using the horizontal laser distance measuring unit 23 and the vertical laser distance measuring unit 24.

For the centering of the pipe to be measured 13 in horizontal direction, the vertical laser distance measuring unit 24 is used. Under the condition that the outer diameter reference surface 54 is measured by the vertical laser distance measuring unit 24, the pipe to be measured 13 is reciprocally moved in horizontal direction and in a direction perpendicularly crossing the center line by using the pipe holding units 11 and 12. When the measurement value of the vertical laser distance measuring unit 24 indicate the minimum value, it means that the horizontal direction of the center line of the pipe to be measured 13 has coincided with the laser beam 22.

Next, for the centering of the pipe to be measured 13 in vertical direction, the horizontal laser distance measuring unit 23 is used. Under the condition that the outer diameter reference surface 54 is measured by the horizontal laser distance measuring unit 23, the pipe to be measured 13 is moved up and down by using the pipe holding units 11 and 12. When the measurement value of the horizontal laser distance measuring unit 23 indicate the minimum value, it means that the vertical direction of the center line of the pipe to be measured 13 has coincided with the laser beam 22.

The object to be measured supporting carriage 3 is moved, the outer diameter reference surface 53 is positioned at the measuring position of the centering laser device 6 and similarly as the measurement of the outer diameter reference surface 54, the centering is performed at the outer diameter reference surface 53. By performing the centering at two points, i.e. at the forward end and at the base end of the pipe to be measured 13, the centering of the entire pipe to be measured 13 is completed.

When the centering of the pipe to be measured 13 is completed, an inner diameter measurement is carried out by the inner diameter measuring unit 19. By measuring the inner diameters of the reference ring 17 and the reference ring 16 by the inner diameter measuring unit 19 in advance, a correlation between a known value and the measurement result of the inner diameter measuring unit 19 can be obtained (calibration). Based on this correlation, when the inner diameter of the pipe to be measured 13 is measured by the inner diameter measuring unit 19, an absolute value (actual dimension) of the inner diameter of the pipe to be measured 13 can be acquired.

The object to be measured supporting carriage 3 is moved, and the inner diameter measuring unit 19 is gradually inserted into the pipe to be measured 13. Because a position in axial direction of the inner diameter measuring unit 19 is fixed, by measuring the position or by the moving amount of the object to be measured supporting carriage 3—that is to say, by measuring the position and the moving amount of the pipe to be measured 13, the position of the inner diameter measuring unit 19 within the pipe to be measured 13 can be specified.

A position in axial direction of the inner diameter measuring unit 19 is set, the measuring instrument holder 41 of the contact type measuring head 31 is moved along the advancing/retreating rail 39, the contact 43 is made to come in contact with the inner surface of the pipe to be measured 13, and a measurement of the contact position is carried out by the electric micrometer 42. Based on the position obtained by the electric micrometer 42 and measuring of moving amount of the measuring instrument holder 41, the inner diameter of the pipe to be measured 13 is measured. The position of the measuring point in circumferential direction can be specified by detecting the rotation angle of the rotating base 37.

Further, by rotating the rotating base 37 for each predetermined rotation angle and by carrying out the measurement sequentially, the radius (inner diameter) for each predetermined angular interval at predetermined axial positions are measured over a total circumference.

Then, the object to be measured supporting carriage 3 is moved toward the measuring device main unit 4 over a predetermined distance, and inner diameter at different position in axial direction can be measured.

It is to be noted that the inner diameter measuring unit 19 is cantilever-supported by the supporting shaft 18 which is long and in an easily vibrated condition, but because a changing of measuring point is performed by moving the pipe to be measured 13 and the inner diameter measuring unit 19 is fixed, a vibration during the moving does not exert influence on the inner diameter measuring unit 19, and the inner diameter measuring unit 19 is maintained in a standstill state. Therefore, the measurement by the inner diameter measuring unit 19 becomes stable.

Further, the inner diameter measuring unit 19 is based on a supporting method, which allows the supporting shaft 18 to bend, and as far as the deflection amount of the supporting shaft 18 is within the range of difference between the outer diameter of the supporting shaft 18 and the inner diameter of the pipe to be measured 13, it does not matter how long the axial length of the supporting shaft 18 is, and the supporting shaft 18 can be used with a sufficient length. Therefore, the measurement of the inner diameter of the pipe to be measured 13 with long length can be carried out.

Further, in a case where the non-contact type measuring head 32 is mounted as the inner diameter measuring unit 19, the measuring device main unit 4 is provided with an image processing device.

The object to be measured supporting carriage 3 is moved toward the measuring device main unit 4 side, the non-contact type measuring head 32 is inserted inside the pipe to be measured 13, the laser beam 49 projected from the laser projector 47 is reflected over total circumference as a diffused reflection light 49' by the cone mirror 48, an optical ring is formed by projecting the diffused reflection light 49' on the inner surface of the pipe to be measured 13. The optical ring is photographed by the CCD camera 46, the inner diameter is measured by an image processing device, or the shape of the optical ring is measured, and the shape of the inner circumference of the pipe to be measured 13 is measured.

By mounting the non-contact type measuring head 32 on the supporting shaft 18 and further by mounting the contact type measuring head 31 using the connection adapter 51, non-contact measurement by the non-contact type measuring head 32 and contact measurement by the contact type measuring head 31 can be performed at the same time.

In this case, the inner diameter and the shape of the inner surface may be measured first by images at as much time interval as required by the non-contact type measuring head 32, the measuring point by contact method is set up from the obtained results, and the points thus set up may be measured with even higher accuracy by using the contact type measuring head 31.

In general, the contact type measurement is more accurate than the non-contact method, while the contact type measurement requires more measurement time. In a case where the non-contact measurement by the non-contact type measuring head 32 and contact measurement by the contact type measuring head 31 are performed at the same time, the inner diameter and the shape of the inner surface are measured first on non-contact basis, and a portion where higher accuracy is required is measured by using the contact type measuring head 31. As a result, the measurement of the inner diameter of a pipe to be measured 13 of long length can be performed with higher accuracy and within short period of time.

Each of the component elements composing the inner diameter measuring device according to the present invention are not limited to those described above, and various types of modification can be adopted.

Figure 7:
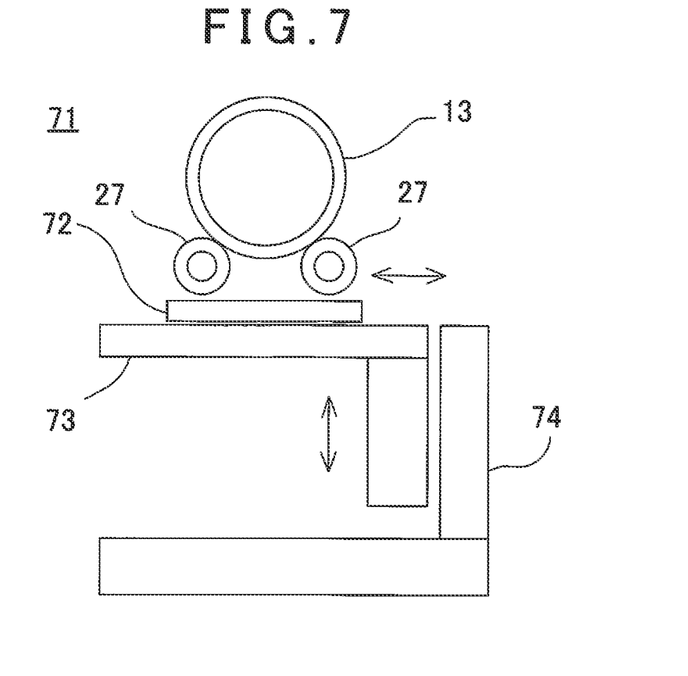
FIG. 7 is a schematical drawing to show another example of a pipe holding unit.

For instance, the pipe holding units 11 and 12 shown in FIG. 2 may be substituted by a pipe holding unit 71 as shown in FIG. 7.

In the pipe holding unit 71, two rollers 27 where the pipe to be measured 13 is placed are disposed on a horizontal sliding plate 72, and the horizontal sliding plate 72 is provided on an ascending/descending slider 73 so as to be movable in horizontal direction, and the ascending/descending slider 73 is provided on abase 74 so as to be able to be ascended or descended.

It is to be noted that, although not shown in the figures, a motor for horizontal movement is connected to the horizontal sliding plate 72, and the position control in horizontal direction of the horizontal sliding plate 72 is possible via the motor. Further, a motor for ascending and descending is connected to the ascending/descending slider 73, and the position of the ascending/descending slider 73 in up-and-down direction can be controlled via the motor.

And, by the position adjustment in horizontal direction of the horizontal sliding plate 72 and by the position adjustment in vertical direction of the ascending/descending slider 73, the center line of the pipe to be measured 13 can be aligned with the laser beam 22.

Figure 8:
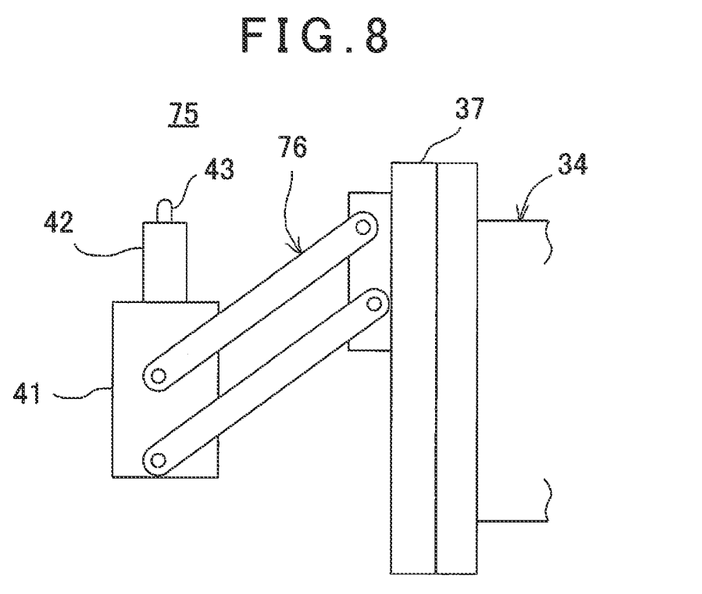
FIG. 8 is a schematical drawing to show another example of a contact type measuring head.

Also, with respect to the non-contact type measuring head 31 shown in FIG. 3, it may be changed to a contact type measuring head 75 as shown in FIG. 8.

In the contact type measuring head 75 as shown in FIG. 8, means for moving the measuring instrument holder 41 in radial direction is designed to be a parallel link 76. The measuring instrument holder 41 is mounted on a rotating base 37 via the parallel link 76, and by swinging the parallel link 76, the electric micrometer 42 is moved in radial direction, and the contact 43 can be brought into contact with inner surface of the pipe to be measured 13.

INDUSTRIAL APPLICABILITY

According to the present invention, an inner diameter measuring device comprises an object to be measured supporting carriage, being arranged movably along a rail installed on an upper surface of a bed and used for holding a hollow pipe to be measured, a supporting shaft extended from a base end to a forward end of the bed, being insertable into the pipe to be measured and being cantilever-supported, and an inner diameter measuring unit installed on a forward end of the supporting shaft, being insertable into the pipe to be measured and for measuring the inner surface of the pipe to be measured under inserted condition, wherein the pipe to be measured and the inner diameter measuring unit are installed along a same reference line, the object to be measured supporting carriage is movable from a condition where the inner diameter measuring unit is withdrawn from the pipe to be measured to a condition where the inner measuring unit reaches a base part of the pipe to be measured, the inner diameter measuring unit is adapted to be inserted into the pipe to be measured, and is adapted to measure an inner diameter of the pipe to be measured in a process where the object to be measured supporting carriage is moved toward the base end of the supporting shaft. As a result, it is possible to measure the inner diameter of a hollow pipe by a device with simple structure.

LEGEND OF REFERENCE NUMERALS

1 Bed
2 Rail
3 Object to be measured supporting carriage
4 Measuring device main unit
6 Centering laser device
7 Forward end slider
8 Base end slider
11,12 Pipe holding unit
13 Pipe to be measured
14 First reference jig unit
15 Second reference jig unit
16,17 Reference ring
18 Supporting shaft
19 Inner diameter measuring unit
21 Laser emitter
22 Laser beam
23 Horizontal laser distance measuring unit
24 Vertical laser distance measuring unit
27 Roller
31 Contact type measuring head
32 Non-contact type measuring head
35 Advancing/retreating unit
37 Rotating base
41 Measuring instrument holder
42 Electric micrometer
43 Contact
46 CCD camera
47 Laser projector
48 Cone mirror
49 Laser beam
49' Diffused reflection light
51 Connection adapter
53,54 Outer diameter reference surface
55 Supporting mechanism unit
75 Contact type measuring head

The invention claimed is:

1. An inner diameter measuring device, comprising an object to be measured supporting carriage, being arranged movably along a rail installed on an upper surface of a bed and used for holding a hollow pipe to be measured, a supporting shaft extended from a base end to a forward end of said bed, being insertable into said pipe to be measured and being cantilever-supported, and an inner diameter measuring unit installed on a forward end of said supporting shaft, being insertable into said pipe to be measured and for measuring the inner surface of said pipe to be measured under inserted condition, wherein said pipe to be measured and said inner diameter measuring unit are installed along a same reference line, said object to be measured supporting carriage is movable from a condition where said inner diameter measuring unit is withdrawn from said pipe to be measured to a condition where said inner measuring unit reaches a base part of said pipe to be measured, said inner diameter measuring unit is adapted to be inserted into said pipe to be measured, and is adapted to measure an inner diameter of said pipe to be measured in a process where said object to be measured supporting carriage is moved toward the base end of said supporting shaft.

2. An inner diameter measuring device according to claim 1, wherein a first reference jig unit is installed on a forward end of said object to be measured supporting carriage, a second reference jig unit is installed on a base end of said object to be measured supporting carriage, wherein said first reference jig unit and said second reference jig unit are installed concentrically with said reference line and have reference rings respectively, each of reference rings has an inner diameter and an outer diameter, and at least inner diameter is already known, wherein the inner diameter of said reference ring is measured by said inner diameter measuring unit, and the measurement result of said pipe to be measured is corrected based on the measurement result of said reference ring.

3. An inner diameter measuring device according to claim 2, wherein said object to be measured supporting carriage has a forward end slider, a base end slider, a connecting member with adjustable length for connecting said forward end slider and said base end slider, and pipe holding units installed on said forward end slider and said base end slider respectively, wherein said pipe to be measured is placed on said pipe holding units where a distance is set according to a length of said pipe to be measured.

4. An inner diameter measuring device according to claim 3, wherein said pipe holding unit comprises a pair of rollers where said pipe to be measured is placed, and a mechanism for adjusting position of said pipe to be measured in horizontal and vertical directions via said roller.

5. An inner diameter measuring device according to claim 1, wherein said object to be measured supporting carriage has a forward end slider, a base end slider, a connecting member with adjustable length for connecting said forward end slider and said base end slider, and pipe holding units installed on said forward end slider and said base end slider respectively, wherein said pipe to be measured is placed on said pipe holding units where a distance is set according to a length of said pipe to be measured.

6. An inner diameter measuring device according to claim 5, wherein said pipe holding unit comprises a pair of rollers where said pipe to be measured is placed, and a mechanism for adjusting position of said pipe to be measured in horizontal and vertical directions via said roller.

7. An inner diameter measuring device according to claim 1, wherein a laser emitter is installed at one end of said bed, and said reference line is formed by a laser beam emitted by said laser emitter.

8. An inner diameter measuring device according to claim 1, further comprising a centering laser device provided so as to stride over said bed at a required position of said bed, wherein said centering laser device has a horizontal laser distance measuring unit for measuring a distance in horizontal direction and a vertical laser distance measuring unit for measuring a distance in vertical direction, said horizontal laser distance measuring unit and said vertical laser distance measuring unit are set up so that a distance measuring light optical axis of said horizontal laser distance measuring unit and a distance measuring light optical axis of said vertical laser distance measuring unit cross on said reference line, and said pipe to be measured has at least two outer diameter reference surfaces separated from each other in axial direction, said pipe to be measured is moved by said object to be measured supporting carriage, said outer diameter reference surface is measured by said horizontal laser distance measuring unit and said vertical laser distance measuring unit, and a centering of said pipe to be measured is performed based on the measurement result.

9. An inner diameter measuring device according to claim 1, wherein said supporting shaft is cantilever-supported by a supporting mechanism unit, said supporting mechanism unit tiltably supports said supporting shaft, and a supporting end of said supporting shaft is tilted so that a center line of said inner diameter measuring unit coincides with said reference line.

10. An inner diameter measuring device according to claim 9, wherein said inner diameter measuring unit is a contact type inner diameter measuring instrument, and comprises a rotating base being rotatable around the center line of the inner diameter measuring unit as the center, a measuring instrument holder provided movably in radial direction on said rotating base, and an electric micrometer being held on said measuring instrument holder.

11. An inner diameter measuring device according to claim 9, wherein said inner diameter measuring unit is a non-contact type inner diameter measuring instrument and comprises a CCD camera, a laser projector and a cone mirror, wherein said CCD camera, said laser projector and said cone mirror are installed on the center line of said inner diameter measuring unit, wherein a laser beam projected from said laser projector is reflected over total circumference by said cone mirror and said CCD camera takes image of an optical ring formed when the laser beam is projected on inner surface of said pipe to be measured.

12. An inner diameter measuring device according to claim 9, wherein said inner diameter measuring unit is configured by integrating a contact type inner diameter measuring instrument comprising a rotating base being rotatable around a center line of the inner diameter measuring unit as the center, a measuring instrument holder provided movably in radial direction on said rotating base and an electric micrometer being held on said measuring instrument holder with a non-contact type inner diameter measuring unit comprising a CCD camera, a laser projector and a cone mirror, wherein said CCD camera, said laser projector and said cone mirror are provided on a center line of said inner diameter measuring unit, wherein a laser beam projected from said laser projector is reflected over total circumference by said cone mirror and said CCD camera takes image of an optical ring formed when the laser beam is projected on inner surface of said pipe to be measured.

13. An inner diameter measuring device according to claim 1, wherein said inner diameter measuring unit is a contact type inner diameter measuring instrument, and comprises a rotating base being rotatable around a center line of the inner diameter measuring unit as the center, a measuring instrument holder provided movably in radial direction on said rotating base and an electric micrometer being held on said measuring instrument holder.

14. An inner diameter measuring device according to claim 1, wherein said inner diameter measuring unit is a non-contact type inner diameter measuring instrument and comprises a CCD camera, a laser projector and a cone mirror, wherein said CCD camera, said laser projector and said cone mirror are provided on a center line of said inner diameter measuring unit, wherein a laser beam projected from said laser projector is reflected over total circumference by said cone mirror and said CCD camera takes image of an optical ring formed when the laser beam is projected on inner surface of said pipe to be measured.

15. An inner diameter measuring device according to claim 1, wherein said inner diameter measuring unit is configured by integrating a contact type inner diameter measuring instrument comprising a rotating base being rotatable around a center line of the inner diameter measuring unit as the center, a measuring instrument holder provided movably in radial direction on said rotating base and an electric micrometer being held on said measuring instrument holder with a non-contact type inner diameter measuring unit comprising a CCD camera, a laser projector and a cone mirror, wherein said CCD camera, said laser projector and said cone mirror are provided on a center line of said inner diameter measuring unit, wherein a laser beam projected from said laser projector is reflected over total circumference by said cone mirror and said CCD camera takes image of an optical ring formed when the laser beam is projected on inner surface of said pipe to be measured.

* * * * *